Patented Oct. 19, 1948

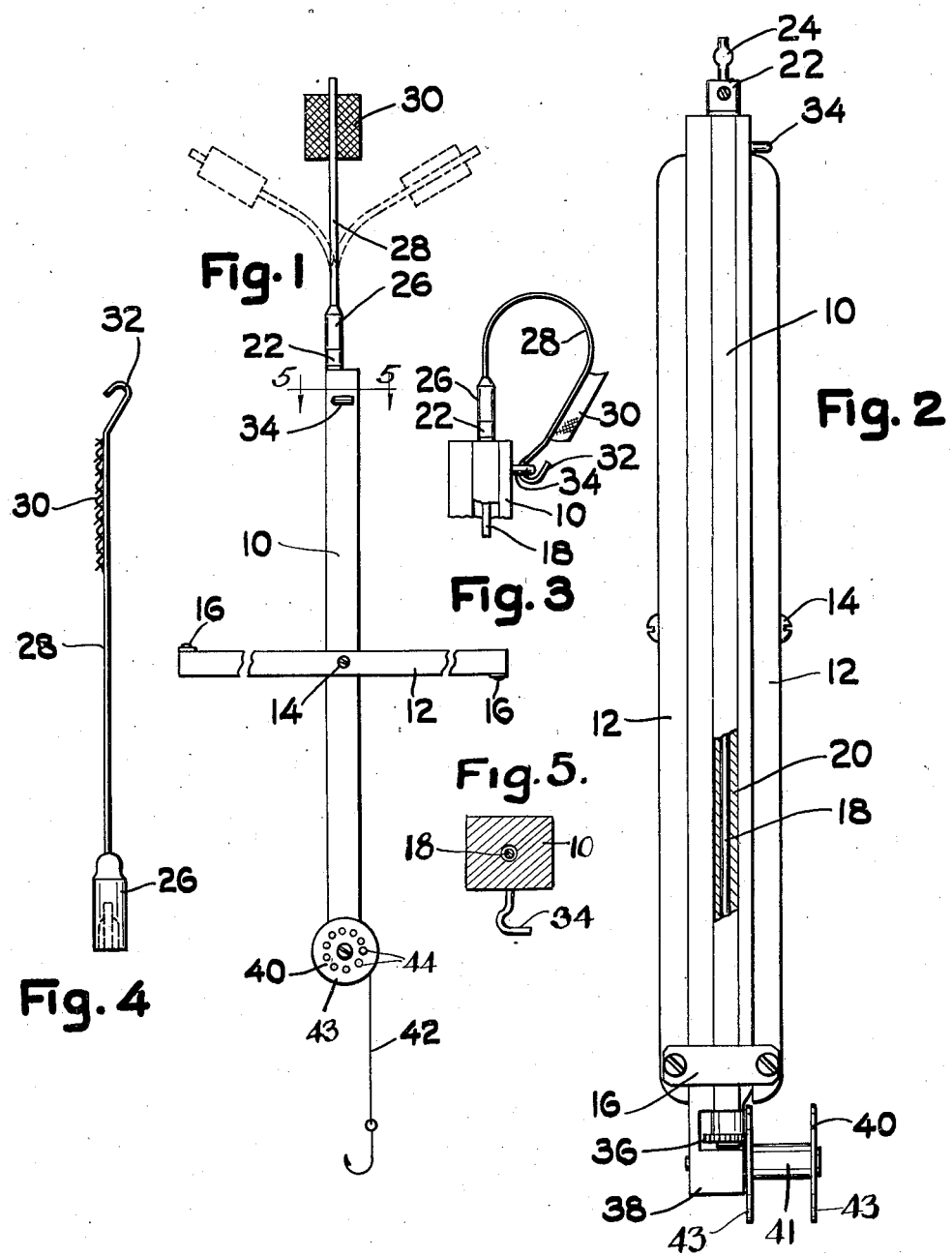

2,451,693

UNITED STATES PATENT OFFICE 2,451,693

SIGNAL DEVICE FOR FISHING TACKLE

Kenneth D. Richards, Gardner, Mass.

Application February 10, 1945, Serial No. 577,238

8 Claims. (Cl. 43—17)

1

This invention relates to automatic signal devices for use in fishing and particularly for use in fishing through the ice.

Objects of the invention include the provision of a support, a line mounted on the support in condition to be used as a fishing line, in combination with a releasable signal which automatically releases when the hook is taken by a fish to indicate that this has occurred, said signal also automatically indicating the speed with which the fish moves away after having taken the hook.

Other objects and advantages of the invention will appear hereinafter.

Reference is to be had to the accompanying drawing in which

Fig. 1 is a view in elevation illustrating the device in use;

Fig. 2 is a view illustrating the device in folded condition and with the signal apparatus removed;

Fig. 3 is a detail view illustrating the signal device in latched position as it appears when the device is set;

Fig. 4 is a detail view of the signal device; and

Fig. 5 is an enlarged section on line 5—5 of Fig. 1.

As shown in Fig. 1 this invention comprises a vertically arranged standard or rod 10 to which is pivotally secured a double frame member 12 as by fasteners or other means 14. The double frame member is connected together at its ends by cleats 16 and these cleats act as stops to position the double frame member in folded condition relative to the standard 10 as shown in Fig. 2. The frame 12 is adapted to be pivoted out relative to the standard 10 as shown in Fig. 1 and this illustrates the operative condition of the device wherein the frame 12 rests on the ice and the standard 10, located in vertical position, depends through the ice.

The standard 10 carries an elongated shaft 18 longitudinally thereof and enclosed therewithin. Shaft 18 runs in grease 20 to protect the same against freezing in the water. At its upper end shaft 18 carries a connecting device or chuck 22 of any desired type. In the present case this device is shown as comprising a plate having an enlargement 24 therein to receive and hold a complementary member 26 in which is embedded, or otherwise secured thereto, a flexible spring strip 28. Strip 28 carries a flag 30 and terminates in a hook 32 so as to be latched on a horizontal hook 34 carried on standard 10. This condition is illustrated in Fig. 3 which shows how the device appears when ready for use.

At its lower end shaft 18 carries a gear 36 and

2 standard 10 mounts a bracket 38 on which is rotatably mounted a reel 40 about which a line 42 is wound. The reel 40 comprises a hub 41 carrying flanges 43, one of which is provided with apertures 44 for reception of the teeth of the gear 36 so that rotation of the wheel will correspondingly rotate shaft 18.

With the device set as shown in Fig. 3 and with the hook baited, the apparatus is placed in position for fishing. When a fish takes the hook there will of course be a tug on line 42 and this tug is sufficient to rotate shaft 18 through the small angle necessary to disengage hook 32 from hook 34 so that the signal 28 pops up from Fig. 3 position to that shown in full lines in Fig. 1. As the fish swims away with the hook, shaft 18 will continue to be rotated and the signal 28 will also rotate and will be forced centrifugally outwardly as indicated by the dotted lines in Fig. 1, the deviation of the signal from the vertical depending on the speed of the fish as it swims away.

From the above description it will be seen that the fisherman is enabled to tell when a fish strikes the hook and whether or not the fish is a shiner since a shiner will only trip the flag but will not cause it to rotate. Also the fisherman can easily see whether the fish is running with the bait and the speed of the fish is shown by the speed and deviation of the spring strip so that he will know whether it is necessary to immediately check the fish. The device cannot fail to work as it will not freeze due to the grease. Where a plurality of these devices are being used, the fisherman can tell at once which to tend first since the signals and flags will be likely to be rotated and deflected to different degrees by different sizes and kinds of fish. The apparatus is simple and rugged in nature, it is easy to pack and carry, and it is simple and inexpensive to manufacture.

Having thus described my invention and the advantages thereof, I do not wish to be limited to the details herein disclosed, otherwise than as set forth in the claims, but what I claim is:

1. A device of the class described comprising a standard adapted to be set in upright position, a resilient signal, means to tension the signal, a shaft mounted on the standard, said signal being rotatable with the shaft, a line, a reel, means to rotate the shaft by the reel as the line pays out, said shaft being adapted to release the tensioned signal upon initial rotation thereof.

2. Apparatus of the class described comprising a standard, a shaft thereon, a signal device secured to the shaft for rotation therewith, a line, a reel therefor, means to rotate the shaft by the reel as the line pays out, and a connection between the standard and signal device, said connection being effective to be released upon initial rotation of the shaft.

3. Apparatus of the class described comprising a standard, a shaft mounted thereon, a reel adapted to carry a line wound thereon, means to rotate the shaft from the reel, a resilient signal on the shaft, and a connection between the signal and standard for tensioning the signal, said connection releasing the signal upon a slight rotation of the shaft, said signal rotating proportionately to the speed of paying out of the line.

4. A device of the class described comprising a support, a shaft thereon, means to rotate the shaft, a flexible resilient signal strip secured to the shaft at one end of the strip, the other end of the strip being free, and means to hold the strip in bent tensioned condition as long as the shaft is stationary, said holding means releasing the strip so that the latter pops up upon a slight turn of the shaft.

5. A device of the class described comprising a support, a shaft thereon, means to rotate the shaft, a flexible spring strip secured to the shaft in longitudinal extension thereof, said strip being free-ended, and means to secure the strip in bowed condition, said last named means releasing the strip so that it pops up upon a small angle of turn of the shaft, said strip assuming normal erect position when the shaft fails to thereafter rotate and rotating therewith and deflecting proportionately to the speed of rotation of the shaft.

6. A device of claim 5 wherein said shaft rotating means comprises a reel, and a line on the reel, said line being payed out and rotating the reel upon a strike by a fish.

7. A device of claim 5 wherein said shaft rotating means comprises a gear on the shaft, a geared reel meshing therewith, and a line on the reel.

8. A device of the class described comprising a standard, a support pivoted thereto intermediate the ends thereof, a shaft in the standard, grease in the standard for the shaft to run in, a hook on the standard, a spring strip detachably secured at one end to the shaft and extending longitudinally thereof above the standard, a hook at the free end of the strip said hooks being effective to hold the strip in bowed condition in the absence of rotation of the shaft, a reel, a line on the reel, and means on the reel to rotate the shaft as the reel rotates paying out the line, rotation of the shaft freeing the strip from the standard hook and causing the strip to rotate on the shaft axis and to be deflected proportionately to the speed of pay out of the line.

KENNETH D. RICHARDS.

REFERENCES CITED

The following references are of record in the file of this patent:

UNITED STATES PATENTS

| Number | Name | Date |
|---|---|---|
| 256,192 | Barnes | Apr. 11, 1882 |
| 1,021,147 | Green | Mar. 26, 1912 |
| 1,758,111 | Henderson | May 13, 1930 |
| 2,089,097 | Millett | Aug. 3, 1937 |
| 2,114,529 | Goodhue | Apr. 19, 1938 |
| 2,198,286 | Krivutza | Apr. 23, 1940 |